(12) United States Patent
Cheng et al.

(10) Patent No.: US 7,969,947 B2
(45) Date of Patent: Jun. 28, 2011

(54) MOBILE TV BROADCAST SYSTEMS AND METHODS BASED ON TD-SCDMA NETWORK

(75) Inventors: Jian Cheng, Shanghai (CN); Datong Chen, Fremont, CA (US); Kang Yi, Shanghai (CN); Zhiqun Chen, Shanghai (CN); Jingdong Lin, Irvine, CA (US)

(73) Assignee: Spreadtrum Communications, Inc., George Town, Grand Cayman (KY)

( * ) Notice: Subject to any disclaimer, the term of this patent is extended or adjusted under 35 U.S.C. 154(b) by 756 days.

(21) Appl. No.: 12/021,275

(22) Filed: Jan. 28, 2008

(65) Prior Publication Data
US 2008/0229367 A1    Sep. 18, 2008

(30) Foreign Application Priority Data
Jan. 26, 2007    (CN) .................. 2007 1 0036853

(51) Int. Cl.
*H04B 7/216* (2006.01)
(52) U.S. Cl. ........................ 370/335; 370/486
(58) Field of Classification Search .................. 370/328, 370/335, 342, 441, 485, 486, 312, 329, 390, 370/432
See application file for complete search history.

(56) References Cited

U.S. PATENT DOCUMENTS

| | | | |
|---|---|---|---|
| 2007/0117538 A1* | 5/2007 | Weiser et al. | 455/406 |
| 2007/0146542 A1* | 6/2007 | Strasser | 348/462 |
| 2007/0165584 A1* | 7/2007 | Ponnampalam et al. | 370/338 |
| 2008/0163282 A1* | 7/2008 | Reponen et al. | 725/9 |

* cited by examiner

*Primary Examiner* — Brian D Nguyen

(57) ABSTRACT

A mobile TV broadcast system based on TD-SCDMA network is disclosed herein.

10 Claims, 6 Drawing Sheets

MOBILE TV BROADCAST SYSTEMS AND METHODS BASED ON TD-SCDMA NETWORK

CROSS-REFERENCE TO RELATED APPLICATION(S)

This application claims priority to Chinese Patent Application No. 200710036853.0, filed on Jan. 26, 2007, the disclosure of which is incorporated herein by reference in its entirety.

TECHNICAL FIELD

The present invention relates to mobile TV broadcast systems in a TD-SCDMA mobile communication network.

BACKGROUND

The 3rd Generation mobile communication standards include FDD, TDD HCR and TDD LCR schemes. FDD is usually called WCDMA while TDD LCR is called TD-SCDMA. TD-SCDMA can be implemented in intra-frequency configuration, which is one type of code resource limited communication system. TD-SCDMA systems can have higher frequency efficiency over WCDMA systems.

Network configuration of TD-SCDMA can have the form of an inter-frequency network or an intra-frequency network. The intra-frequency network can include 1.6 MHz intra-frequency network and 5 MHz intra-frequency network. Multiple accessing for neighboring cells is based on FDMA for inter-frequency configuration. The assigned frequency resources can be utilized for all Node-Bs in 1.6 MHz intra-frequency network. The 1.6 MHz intra-frequency network configuration has the highest frequency efficiency with severe intra-frequency interference. 5 MHz intra-frequency configuration, based on the N-frequency point protocol, is the tradeoff of the inter-frequency and intra-frequency technology, i.e., the $0^{th}$ timeslot bearing common control information, such as PCCPCH/SCCPCH information, is inter-frequency configured, while $1^{st}$ to $6^{th}$ timeslot is intra-frequency configured. Smart antenna and dynamic channel allocation can be adopted for intra-frequency configured TD-SCDMA system to decrease the strong intra-frequency interference.

FDMA, TDMA and CDMA are employed for multiple accessing in a TD-SCDMA system, which is suitable for dedicated traffic, such as speech and data traffic. In contrast, broadcast information should be receivable for all users, and so the so called multiple accessing for dedicated traffic is not suitable any more.

DETAILED DESCRIPTION

Figure 1:
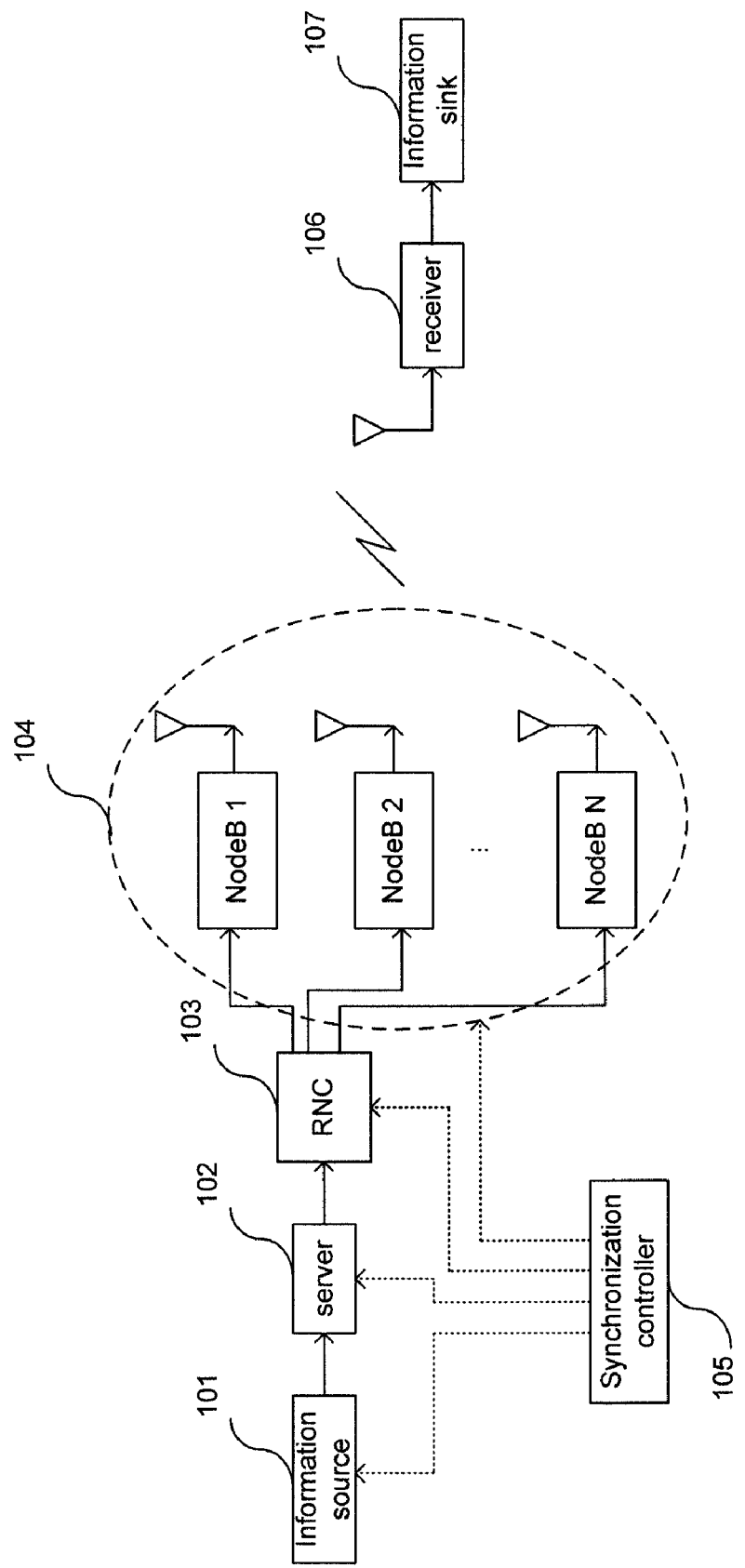
FIG. 1 is a diagram of an implementation entity of the mobile TV broadcast system based on a TD-SCDMA network.

The detailed description of an implementation embodiment and the drawings are present as follows. In one embodiment, a mobile TV broadcast system based on a TD-SCDMA network is presented. The TV broadcast system is configured to provide mobile broadcast services such as mobile TV, with minimal modification of hardware configuration at both the network side and the mobile receiver side.

The mobile TV broadcast system based on a TD-SCDMA network can include the following components:

A transmitting side, to encode the speech, video and other multimedia information and to transmit such information via the TD-SCDMA network. The transmitting side can include:

An information source unit of the mobile TV broadcast to provide speech, video and other multimedia information for the mobile TV;

A mobile TV broadcast server connected to the information source unit of the mobile TV broadcast system for performing the source information storage;

A radio network controller (RNC) connected to the mobile TV broadcast server for performing radio resource management;

A group of Node-Bs connected to the RNC for performing transmission of mobile TV broadcast signals as single-frequency network transmissions;

A synchronization controller for the Node-Bs connected to the information source unit of the mobile TV broadcast, the mobile TV broadcast server, the RNC, and the group of Node-Bs for performing synchronization of the information source unit and the group of the Node-Bs to keep the transmitted signals among these node-Bs the same.

A receiving side for receiving the mobile TV broadcast signals and demodulating the speech, video and other multimedia information. The receiving side can include:

A receiver of the mobile TV broadcast. The receiver realizes diversity receiving from multiple downlink transmission of all distinguishable Node-Bs by multi-path combination of multiple downlink transmissions;

An information sink unit of the mobile TV broadcast. The information sink unit is connected to the receiver of the mobile TV broadcast for recovering the speech and video from the received mobile TV signals.

In the mobile TV broadcast system based on TD-SCDMA, the group of Node-Bs can also include:

A physical channel mapping unit that maps the transport channel data to physical channel;

A baseband modulation unit, connected to the physical channel mapping unit, performing digital baseband data modulation;

A burst forming unit connected to the baseband modulation unit for performing burst forming of the modulated signals output from baseband modulation unit;

A spreading and scrambling unit connected to the burst forming unit for performing spreading and scrambling of the modulated signals output from the baseband modulation unit;

A midamble code forming unit connected to the burst forming unit for forming the midamble code related to the mobile TV broadcast traffic;

A pulse shaping filtering unit connected to the burst forming unit for performing low-pass-filtering of the output signals from burst forming unit;

The first analog baseband unit connected to the pulse shaping filtering unit for performing another low-pass-filtering of the burst impulse in analog domain and performing digital to analog converse (DAC);

A radio modulation unit connected to the analog baseband unit for performing radio modulation and transmission of the output data from the filtering unit.

In the mobile TV broadcast system based on TD-SCDMA network, the receiver of the mobile TV broadcast can further include:

A second analog baseband unit for performing low-pass filtering and analog-to-digital converse to form digital baseband signals;

A match filtering unit connected to the second analog baseband unit for performing match filtering of the digital baseband signals;

A data splitting unit connected to match filtering unit to split midamble data and user data according to the time slot configuration;

A channel estimation unit connected to the data splitting unit for performing channel estimation by utilizing midamble data;

A midamble interference cancellation unit connected to the data splitting unit and the channel estimation unit for performing interference cancellation by subtracting the user data interference from the midamble data;

A signal detection unit connected to the channel estimation unit and midamble interference cancellation unit for performing user information detection and demodulation from the user data after midamble interference cancellation.

In the mobile TV broadcast system based on TD-SCDMA network, the synchronization procedure of the controller for the transmission at the Node-Bs includes accurate synchronization of the Node-Bs, including timeslot synchronization, frame synchronization and TTI synchronization; performing synchronization of the transmitted signals from the Node-Bs; maintaining the same working mode (such as Common Mode) among these Node-Bs; using the same midamble code with the same circular phase shift; and maintaining the same transmitted symbols from the multiple Node-Bs for the all the time duration, including the impulse of the digital baseband signals and the profile of the analog baseband signals.

In the mobile TV broadcast system based on TD-SCDMA network, the transmission of the Node-Bs via the single frequency network includes transmission by a radio carrier via wireless channel having a bandwidth of 1.6 MHz in a single frequency configured network, or transmission by multiple radio carriers via multiple wireless channels each with a bandwidth of 1.6 MHz each in a N-frequency network.

In the mobile TV broadcast system based on TD-SCDMA network, the midamble code adopts the Common Mode with shortened midamble effective length to enlarge the circular prefix. The length of the circular prefix is set to $L_{max}+16$ chips, and the length of the basic midamble code equals to $128-L_{max}$.

In the mobile TV broadcast system based on TD-SCDMA network, the parameter of $L_{max}$ is usually set to [−8 48].

In the mobile TV broadcast system based on TD-SCDMA network, the parameter of $L_{max}$ is usually set to 16.

In the mobile TV broadcast system based on TD-SCDMA network, the channel estimation unit performs channel estimation as:

$$h = IFFT\left(\frac{FFT(r_m(L_{max}+17:144), 128-L_{max})}{FFT(m(1:128-L_{max}), 128-L_{max})}, 128-L_{max}\right),$$

where m denotes the basic midamble code, rm is the received midamble code field, h is the estimated channel, FFT(x,l) and IFFT(x,l) represent the fast Fourier transform and the inverse fast Fourier transform.

In the mobile TV broadcast system based on TD-SCDMA network, the signal detection unit utilizes a joint detection algorithm to detect and demodulate user information.

One feature of several embodiments of the TV broadcast system described above is that the TD-SCDMA network is separated into two layers: one layer for traditional mobile communication traffic, and the other for mobile TV broadcast network with information transmission from all Node-Bs. From the transmission side of the network, single frequency transmission technology is adopted to form the single frequency network. At the same time, the mobile receiver receives the downlink signals from all recognizable Node-Bs as multi-path resources with diversity combination. Therefore, mobile TV broadcast service based on TD-SCDMA network can be realized, with minimal or no modification of hardware configuration at both network and mobile side, and small modification for the implementation complexity at the mobile receiver.

FIG. 1 illustrates one embodiment of the mobile TV broadcast system based on TD-SCDMA network described above. As demonstrated in FIG. 1, the left side is the transmission side, and the right side is the receiving side of the system communicating with one another via a TD-SCDMA network. The transmission side performs encoding the speech and media and transmitting the encoded information via the TD-SCDMA network. The transmission side can include: an information source of the mobile TV broadcast 101, a server of the mobile TV broadcast 102, a radio network controller 103, a group of Node-Bs 104 and a synchronization controller of the Node-B transmitter 105. The receiving side performs receiving information from the TD-SCDMA network, demodulating the original information and recovering the speech and the media. The receiving side can: a receiver of the mobile TV broadcast 106 and information sink unit of the mobile TV broadcast 107.

The information source unit of the mobile TV broadcast system 101 stores the speech and video source information data. The server of the mobile TV broadcast 102 is connected to the information source unit 101 to accept the mobile TV signals stored in 101. The source information unit 101 and the server 102 can work together. The radio network controller (RNC) 103 is connected to the server of the mobile TV broadcast to perform radio resource management. The group of the Node-Bs 104 such as Node-B1 and Node-B2, are connected to the RNC 103 to perform the transmission of the mobile TV broadcast signals in the form of the single-frequency transmission. The synchronization controller 105 for the Node-B transmitter is connected to the source information unit of the mobile TV broadcast 101, the mobile TV broadcast server 102, the RNC 103 and the group of the Node-B 104 to perform synchronization between the source information unit 101 and the group of the Node-B 104 to keep the transmitted signals among these Node-Bs the same. The synchronization controller of the Node-Bs 105 is to perform timeslot synchronization, frame synchronization and TTI synchronization; to maintain the working mode as the same among these Node-Bs, such as Common Mode; to use the same midamble code with the same circular phase shift; to maintain the same transmitted symbols from multiple Node-Bs for the all the time duration, including the impulse of the digital baseband signals and the profile of the analog baseband signals. Referring to FIG. 4A, the mobile TV broadcast signals are transmitted via the single frequency network with single or multiple 1.6 MHz frequency band resources, which can be configured flexibly according to service requirement based on N-frequency point protocol.

At the receiving side, the receiver of the mobile TV broadcast 106 realizes diversity receiving and demodulation from multiple downlink transmission of all distinguishable Node-Bs, by multi-path combination from multiple downlink transmission. The information sink unit of the mobile TV broadcast 107 is connected to the receiver 106 to perform recovering of speech and video traffic from the demodulated signals of the mobile TV broadcast.

Figure 2:
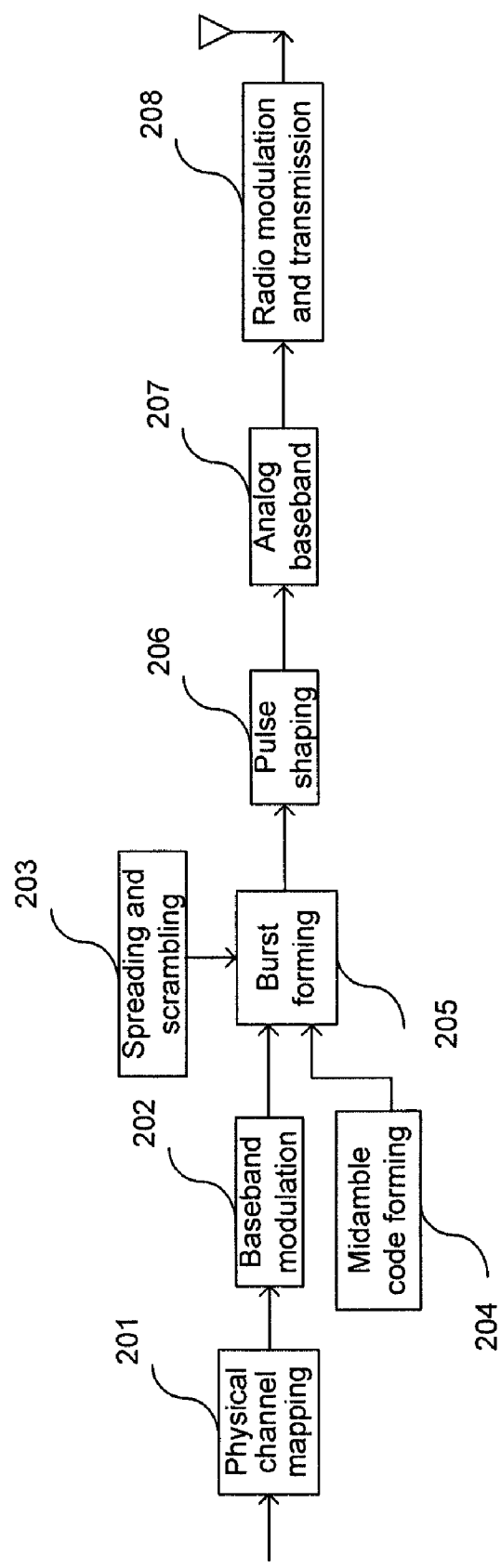
FIG. 2 is a diagram of a transmission side of the invention.

FIG. 2 shows a diagram of one embodiment of the Node-B transmitter part. As shown in FIG. 2, the transmitter of Node-B can include: a physical mapping unit 201, a baseband modulation unit 202, a burst forming unit 205, a spreading and scrambling unit 203, a midamble code forming unit 204, a pulse shaping unit 206, a first analog baseband unit 207 and a radio modulation and transmission unit 208.

According to 3GPP standard, the physical mapping unit 201 maps the CCTRCH data to the physical channel as described in 3GPP 25.222 specification incorporated herein by reference. The baseband modulation unit 202 is connected to the mapping unit 201 to perform the baseband modulation of the digital baseband data. The modulation of the TD-SCDMA is chosen from QPSK, 16QAM and 8PSK. The burst forming unit 205 is connected to the modulation unit 202, the spreading and scrambling unit 203, and the midamble code forming unit 204. The spreading and scrambling unit 203 performs spreading and scrambling of the modulated data from the baseband modulation unit 202 in the burst forming unit 205. The midamble code forming unit 204 forms the midamble data for the mobile TV broadcast. The pulse shaping unit 206 is connected to the burst forming unit 205 to perform the low pass filtering of the burst data. The pulse shaping unit output data is sent to the first analog baseband unit 207 to perform analog low pass filtering and digital to analog conversion, and further transmitted from the radio transmission unit 208 after radio modulating.

Figure 5:
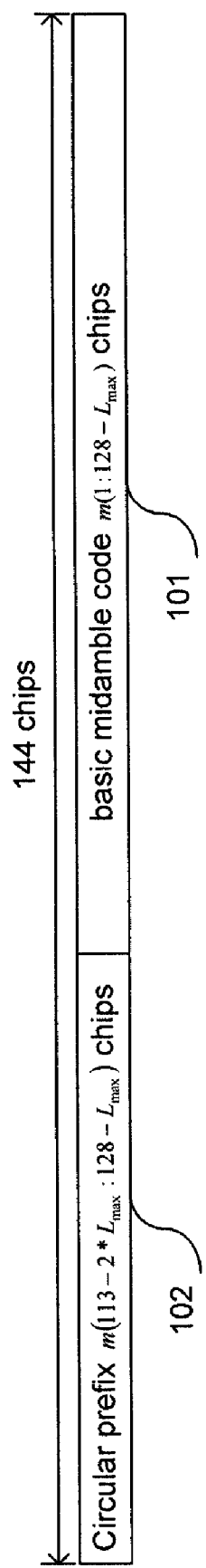
FIG. 5 is an illustration of the midamble code configuration.

The midamble code forming unit 204 configures the common mode, and the effective length of midamble code is lessened to enlarge the length of the circular prefix, which can improve the tolerance of the system to multi-path transmission in a single frequency network. Traditionally, the midamble code has 144 chips, the first 16 of which are the same as the last 16 chips somewhat similar to the OFDM circular prefix. The received last 128 chips of data are the circular convolution of the midamble code and the channel impulse response so that FFT and IFFT can be conveniently used to perform channel estimation. The traditional midamble code configuration can recognize mostly 16 chips multi-path. It is suitable for traditional dedicated traffic such as speech and video, but for broadcast service such as mobile TV broadcast service by a single frequency network it is not suitable because the received signals are transmitted from multiple Node-B with different time advance (TA). The 144 chips midamble code can be formed according to FIG. 5 in accordance to one embodiment. The length of the circular prefix is set to $L_{max}+16$ chips, then the effective midamble code has the length of $128-L_{max}$ chips, so that the channel estimation can handle totally $L_{max}+16$ chips multi-path, where $L_{max}$ is configurable, such as from −8 to 42, without loss of the generalization, $L_{max}$ is set to 16, then the system can support a total of 32 chips multi-path. $L_{max}$ can also be set to some minus number such as −8 for the performance increase when the multi-path is not very severe.

Figure 3:
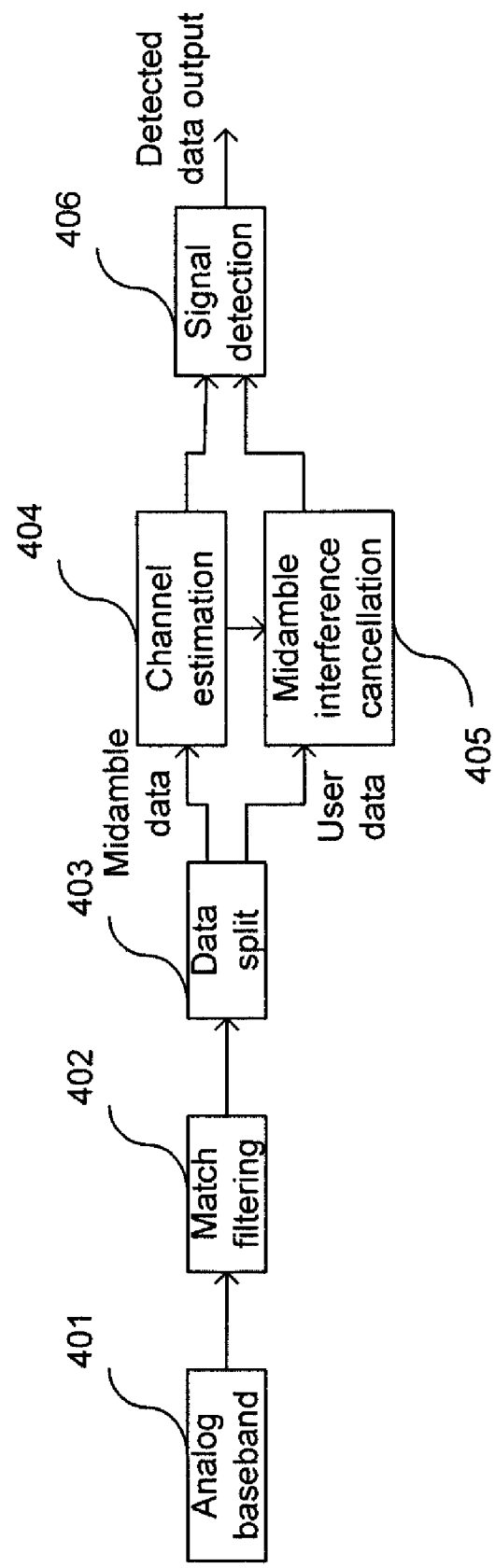
FIG. 3 is a diagram of a mobile TV broadcast receiver of the invention.

FIG. 3 is a diagram of one embodiment of the receiver of the mobile TV broadcast. Referring to FIG. 3, the receiver of the mobile TV broadcast is the upgrade over the traditional TD-SCDMA mobile handset to support the mobile TV broadcast service. The receiver of the mobile TV broadcast includes: a second analog baseband unit 401, a matching filtering unit 402, a data splitting unit 403, a channel estimation unit 404, midamble interference cancellation unit 405, and a signal detection unit 406. The second analog baseband unit 401 performs low pass filtering and analog to digital conversion to form the digital baseband signals. The matching filtering unit 402 is connected to the second analog baseband unit 401 to perform match filtering of the digital baseband signals. The data splitting unit 403 is connected to the match filtering unit 402 to split the received data into midamble data and user data. The channel estimation unit 404 is connected to the data splitting unit 403 for channel estimation by utilizing the split midamble data.

One method of channel estimation can be performed as follows: suppose m is the basic midamble code, the received midamble data is $r_m(n), n=1, 2, \ldots 144$, then the estimated channel is given as:

$$h = IFFT\left(\frac{FFT(r_m(L_{max}+17:144), 128-L_{max})}{FFT(m(1:128-L_{max}), 128-L_{max})}, 128-L_{max}\right)$$

where $FFT(x,l)$, $IFFT(x,l)$ are the fast Fourier transform and inverse fast Fourier transform with the length of l.

Figure 4B:
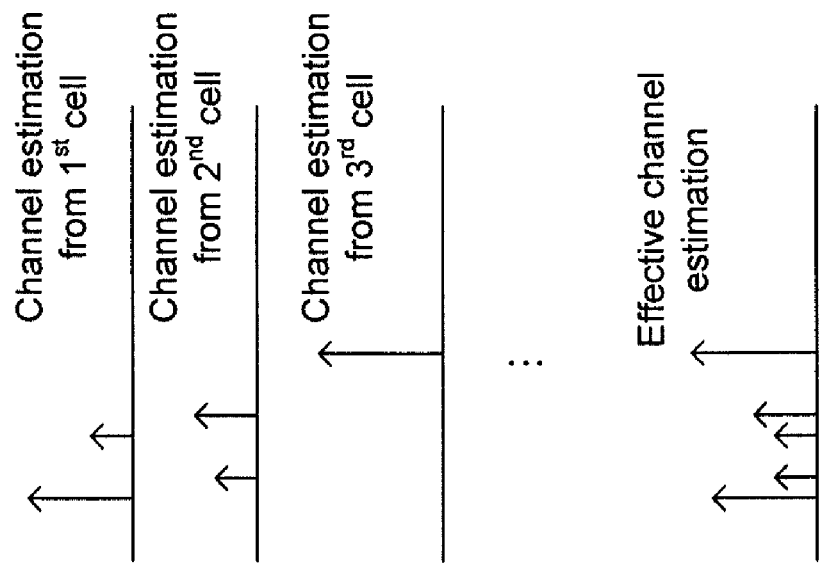
FIG. 4B is a schematic of effective channel estimation of the invention.
Figure 4A:
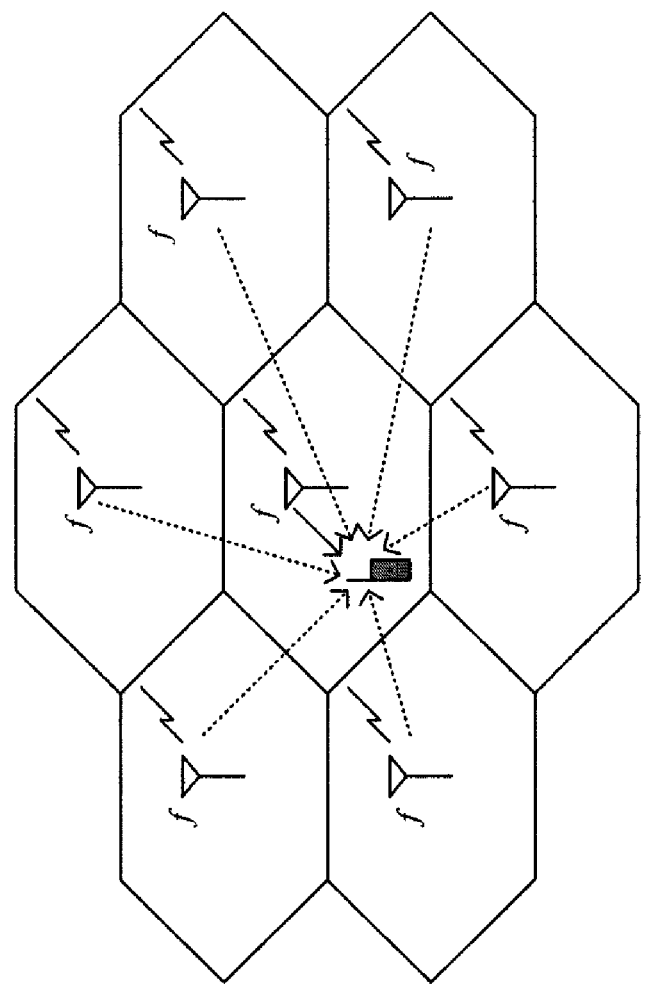
FIG. 4A is a schematic of a single frequency TD-SCDMA network.

FIG. 4B is an illustration of an effective estimated channel response in accordance to one embodiment. The midamble interference cancellation unit 405 is connected to the data splitting unit 403 and the channel estimation unit 404 to perform the interference cancellation. Channel estimation unit 404 together with the user data with interference cancelled is connected to the signal detection unit 406. The signal detection unit 406 adopts traditional joint detection algorithm or equalization algorithm to detect and demodulate the user information data.

Figure 6:
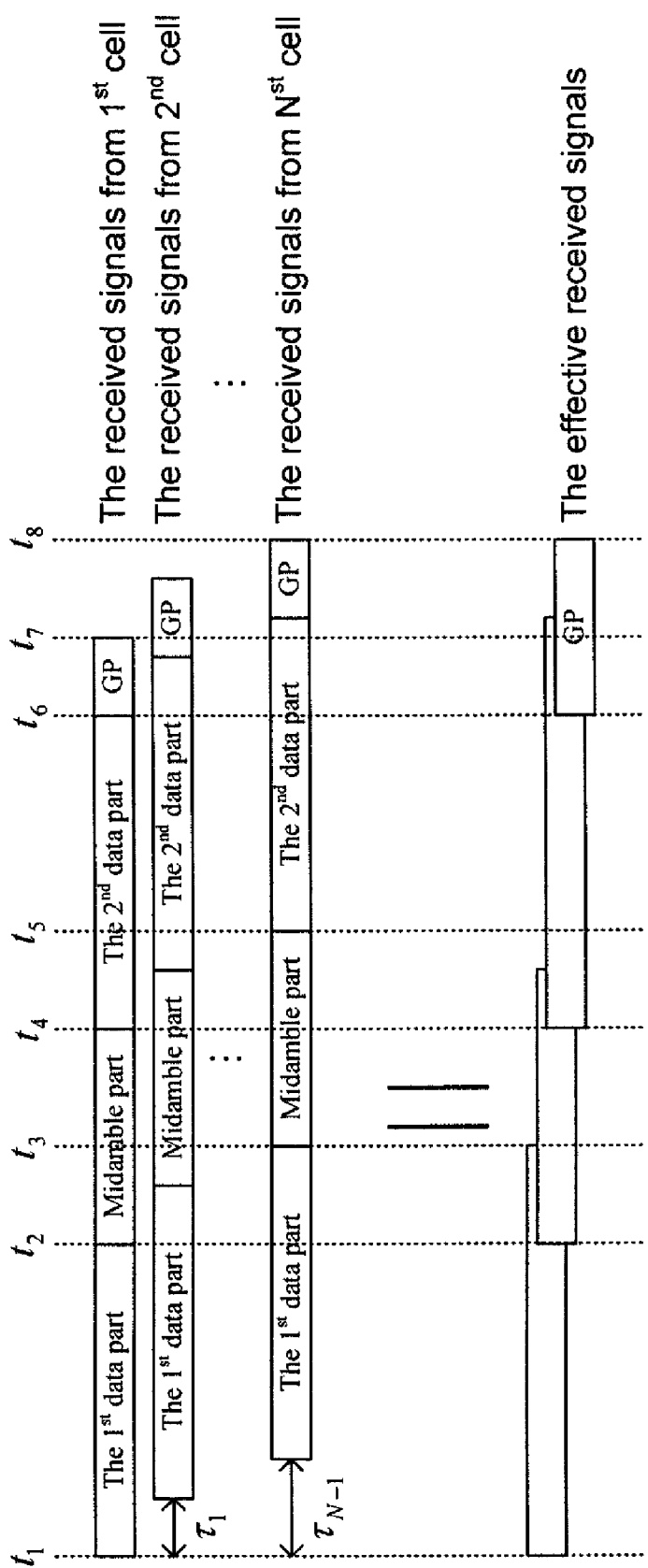
FIG. 6 is an depiction of the received signals.

Referring to FIG. 6, assume the received signal is $r(n)$, $n=1, 2, \ldots, 864$, by comparing to the time ruler in FIG. 6, $r(n)$ can be separated to 3 segmentations: $r_{d1}(n), n=1, 2, \ldots, 367+L$; $r_m(n), n=369+L_{max}, 370+L_{max}, \ldots, 496$; $r_{d2}(n), n=497, 498, \ldots, 863+L$, wherein $r_{d1}$ corresponds to the time point from t1 to t3; similarly, $r_{d2}$ corresponds to the time point from t4 to t7 together with L times 0, assuming that $r(m)$ is the received 128 chips data before the time point t4. Add $L=\lfloor 1.28*10^6 * \tau_{N-1} \rfloor$ zeros to the $r(n)$, while $\tau_{N-1}=\max(\tau_1, \tau_2, \ldots, \tau_{N-1})$ and $\tau_1, \tau_2, \ldots, \tau_{N-1}$ is the $2^{nd}, 3^{rd}, \ldots, N^{th}$ cell's transmission delay relative to the $1^{st}$ cell.

The $r_{d1}$, $r_{d2}$ and h are sent to the signal detection unit 406, where joint detection algorithm is applied to detect and to demodulate the downlink data of the mobile TV broadcast service.

Assuming the receiving model is $r_d=As+n$, where $r_d$ is the received user data, such as $r_{d1}$, $r_{d2}$; A is the transport matrix which is constructed from channelized codes (e.g., Walsh spreading codes), scrambling codes and the estimated channel response; s is the modulated signals sent from Node-Bs; n is the Gaussian additive nose.

The estimated signals from joint detection method is:

$$\hat{s}_{ZF} = (A^H A)^{-1} A r_d,$$

$$\hat{s}_{MMSE} = (A^H A + \delta_n^3 \cdot I)^{-1} A r_d$$

where $\hat{s}_{ZF}$ and $\hat{s}_{MMSE}$ is the detected signals from Zero-Forcing and Minimum mean squared error algorithm respectively. $\delta_n^2$ is the variance of the Gaussian additive noise.

The terminology used in the description presented above is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this "Detailed Description" section.

We claim:

1. A mobile TV broadcast system based on a TD-SCDMA network with single-frequency network (SFN), the mobile TV broadcast system comprising:
  a transmitting side that encodes multimedia information and transmits the encoded multimedia information via the TD-SCDMA network, the transmitting side further including:
   information source unit that provides multimedia information;
   a mobile TV broadcast server connected to the information source unit, the mobile TV broadcast server performing source information storage;
   a radio network controller (RNC) connected to the mobile TV broadcast server, the RNC performing radio resource management;
   a group of Node-Bs transmitters connected to the RNC and performing transmission of mobile TV broadcast signals as single-frequency network (SFN) transmission;
   a synchronization controller for the Node-B transmitters and connected to the information source unit of the mobile TV broadcast system, the mobile TV broadcast server, the RNC, and the group of Node-Bs, the synchronization controller performing synchronization between the information source unit and the group of the Node-Bs;
  a receiving side that receives the mobile TV broadcast signals and demodulates the multimedia information, the receiving side further including:
   a receiver that realizes diversity receiving from multiple downlink transmission of all distinguishable Node-Bs via multi-path combination from the multiple downlink transmission; and
   an information sink unit connected to the receiver of the mobile TV broadcast system, the information sink unit recovering speeches and videos from the received mobile TV broadcast signals.

2. The mobile TV broadcast system of claim 1, wherein the group of Node-Bs further include:
  a physical channel mapping unit that maps transport channel data to a physical channel;
  a baseband modulation unit connected to the physical channel mapping unit, the baseband modulation unit performing digital baseband data modulation;
  a burst forming unit connected to the baseband modulation unit, the burst forming unit performing burst forming of modulated signals output from the baseband modulation unit;
  a spreading and scrambling unit connected to the burst forming unit, the spreading and scrambling unit performing spreading and scrambling of modulated signals output from the baseband modulation unit;
  a midamble code forming unit connected to the burst forming unit, the midamble code forming unit forming the midamble code related to the mobile TV broadcast signals;
  a pulse shaping filtering unit connected to the burst forming unit, the pulse shaping filtering unit performing low-pass-filtering of the output signals from the burst forming unit;
  a first analog baseband unit connected to the pulse shaping filtering unit, the first analog baseband unit performing another low-pass-filtering of burst impulses in analog domain and digital to analog conversion; and
  a radio modulation unit connected to the first analog baseband unit, the radio modulation unit performing radio modulation and transmission of output data from the filtering unit.

3. The mobile TV broadcast system of claim 2, wherein the midamble code adopts a Common Mode, with a shortened effective length of the midamble code to enlarge a circular prefix, and wherein a length of the circular prefix is set to $L_{max}+16$ chips, and wherein a length of a basic midamble code equals to $128-L_{max}$; $L_{max}$ is an integral parameter.

4. The mobile TV broadcast system of claim 3, wherein $L_{max}$ is set to [−8,48].

5. The mobile TV broadcast system of claim 3, wherein $L_{max}$ is set to 16.

6. The mobile TV broadcast system of claim 1, the receiver of the mobile TV broadcast system further includes:
  a second analog baseband unit that performs low-pass filtering and analog-to-digital conversion to form digital baseband signals;
  a match filtering unit connected to the second analog baseband unit, the match filtering unit performing match filtering of the digital baseband signals;
  a data splitting unit connected to the match filtering unit, the data splitting unit splits midamble data and user data according to a timeslot configuration;
  a channel estimation unit connected to the data splitting unit, the channel estimation unit performing channel estimation from received midamble data;
  a midamble interference cancellation unit connected to the data splitting unit and the channel estimation unit, the midamble interference cancellation unit performing interference cancellation by subtracting the user data interference from the midamble data;
  a signal detection unit connected to the channel estimation unit and the midamble interference cancellation unit, the signal detection unit performing user information detection and demodulation from the user data after midamble interference cancellation.

7. The mobile TV broadcast system of claim 6, wherein the channel estimation unit performs channel estimation as:

$$h = IFFT\left(\frac{FFT(r_m(L_{max}+17:144), 128-L_{max})}{FFT(m(1:128-L_{max}), 128-L_{max})}, 128-L_{max}\right),$$

Where m denotes the basic midamble code, $r_m$ is a received midamble code field, h is the estimated channel, FFT (x, l) and IFFT (x, l) represent the fast Fourier transform and the inverse fast Fourier transform with a length of l.

8. The mobile TV broadcast system of claim 6, wherein the signal detection unit utilizes a joint detection algorithm to detect and to demodulate the user information.

9. The mobile TV broadcast system of claim 1, transmission at the Node-Bs is configured to perform:
accurate synchronization of the Node-Bs including timeslot synchronization, frame synchronization and TTI synchronization;
synchronization of the transmitted signals from the Node-Bs;
maintaining a common working mode among all of the Node-Bs;
maintaining a basic midamble code with a same circular phase shift; and
maintaining same transmitted symbols from multiple Node-Bs for all time durations, including the burst impulse of digital baseband signals and the profile of analog baseband signals.

10. The mobile TV broadcast system of claim 1, wherein transmission from the single frequency network configured Node-Bs including transmission by a radio carrier with a bandwidth of 1.6 MHz from the single frequency network or transmission by multiple radio carriers each with a bandwidth of 1.6 MHz each from the single frequency network.

* * * * *